Sept. 20, 1971           J. K. JOHNSON           3,606,273
FLOAT, PUMP AND MOTOR ASSEMBLY
Filed Jan. 15, 1970                2 Sheets-Sheet 1
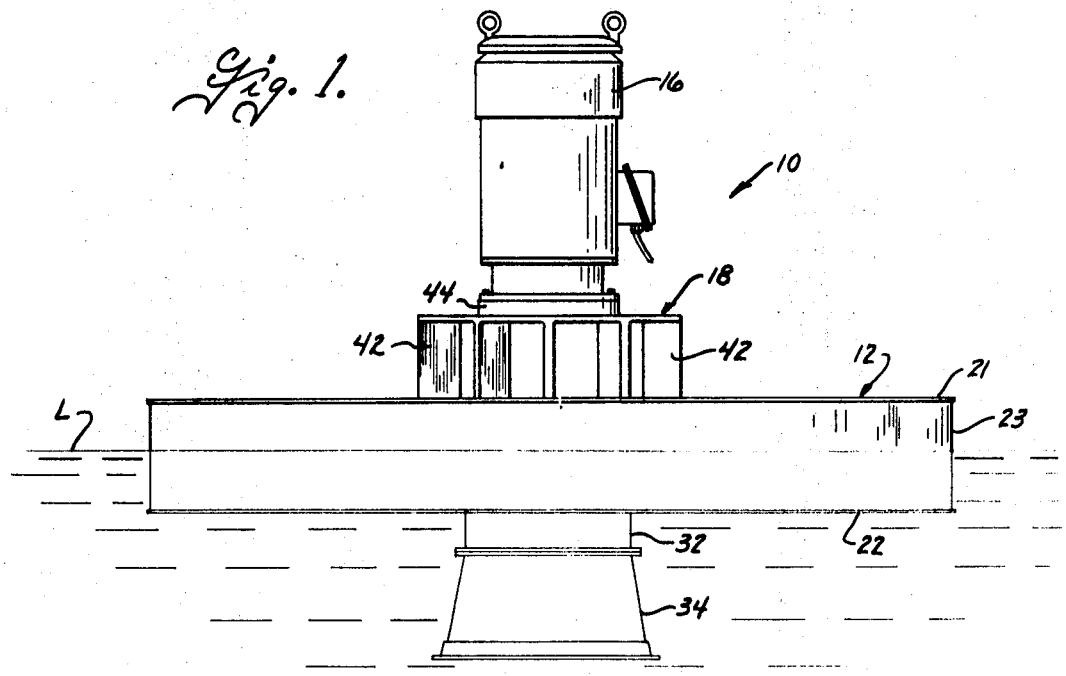
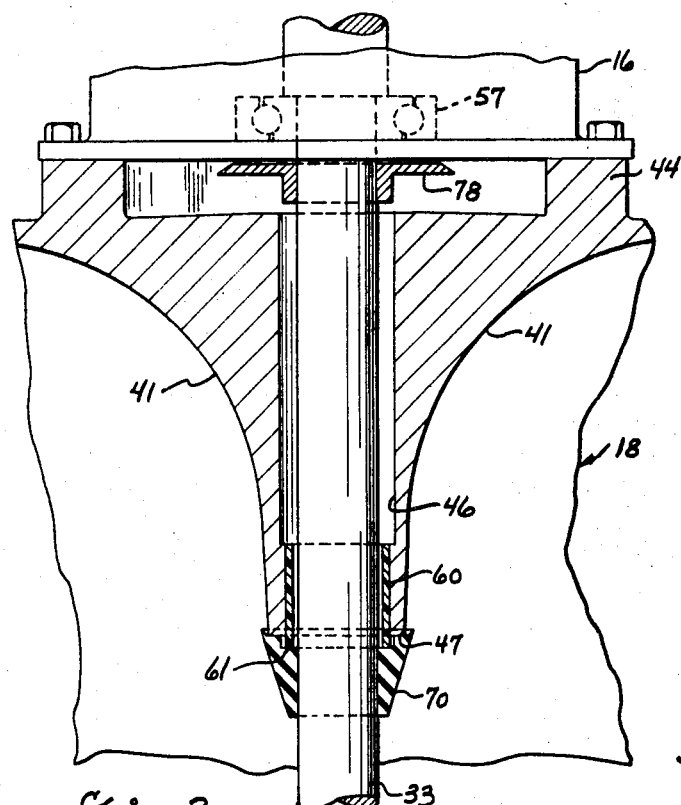
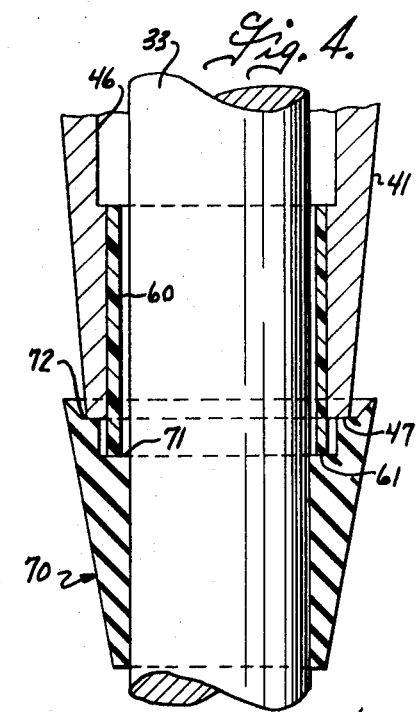
Inventor
John K. Johnson
By
McCanna, Morsbach, Pillote + Muir
Attorneys

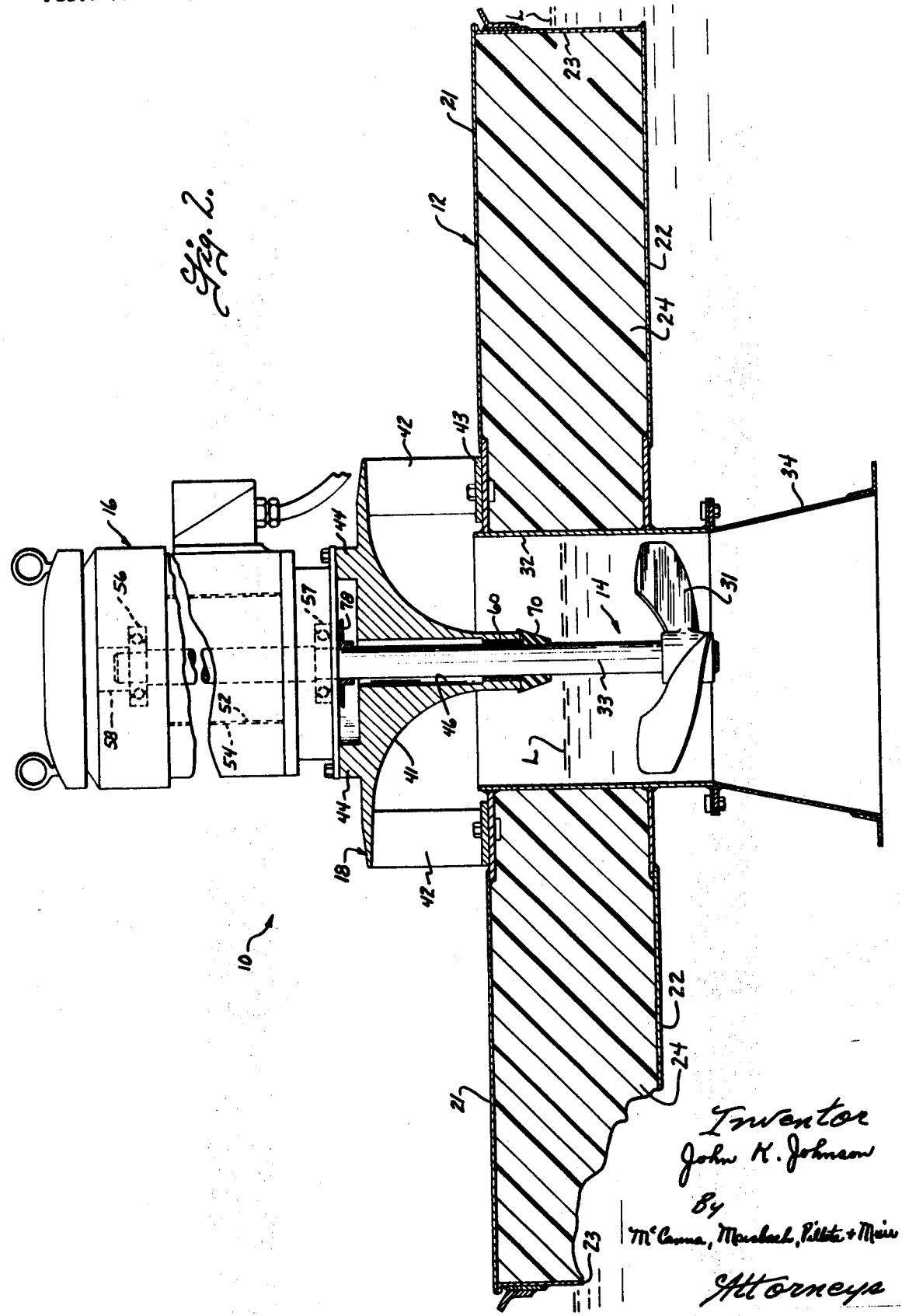

United States Patent Office 3,606,273
Patented Sept. 20, 1971

3,606,273
FLOAT, PUMP AND MOTOR ASSEMBLY
John K. Johnson, Rockford, Ill., assignor to
Aqua-Aerobic Systems Inc., Rockford, Ill.
Filed Jan. 15, 1970, Ser. No. 3,074
Int. Cl. B01f 5/12
U.S. Cl. 259—95
11 Claims

ABSTRACT OF THE DISCLOSURE

The assembly includes a float, a vertical propeller pump and a motor. Combined radial and thrust bearings are provided at the motor for supporting a one-piece shaft on which the propeller is mounted. The motor is supported on a casting which serves as a diffuser for the liquid pumped. A deflection bearing is mounted on the casting in spaced relation to the shaft and is operative to engage the shaft when it is deflected. A deflector hub is mounted on the shaft and engages the lower end of the deflection bearing to form a seal therewith. The unique shape of the deflector hub is best understood by reference to the drawings.

BACKGROUND

The invention pertains to floatable pump and motor assemblies, and more particularly to such an assembly which includes a float, a rotary propeller pump, and a motor.

The apparatus of the present invention is designed for liquid aeration, and is arranged to float in a body of liquid and pump the liquid into the air. In this art, the combination of a float, pump and motor is known, wherein the propeller shaft is connected to the motor shaft by means of a flexible coupling to overcome alignment problems. The propeller shaft is then supported on bearings with one of the bearings usually being as close to the propeller as practical. In such case, the last-mentioned bearing is immersed in the fluid. Additionally, in operations of this type, it is not uncommon for sludge or floating objects to be drawn into the pump. One advantage of the propeller pump is that it can handle such objects. When the propeller strikes an obstruction, the shaft may be deflected. If the shaft is rigid, the object may become wedged between the propeller and the adjacent housing. If a screen is provided for screening out such obstructions, they may clog the inlet to the pump. Obviously, when the pump is floating in a body of liquid, it is inconvenient to remove any wedged objects or to clean the inlet to the pump.

SUMMARY

The present invention relates to float, pump and motor assemblies, and more particularly to improvements in such an assembly that includes a rotatable propeller pump.

It is the general object of the present invention to provide a low maintenance float, pump and motor assembly which is usable for liquid aeration and is capable of continuous duty.

Another object of the present invention is to provide an assembly in accordance with the foregoing object which includes combined radial and thrust bearings at the motor, and a one-piece shaft supported by those bearings and having the propeller mounted thereon.

Another object is to provide a float, pump and motor assembly having a deflection bearing spaced from the shaft under ordinary operating conditions and operative to engage the shaft when it is deflected to prevent excessive deflection.

Yet another object of the present invention is to provide an assembly which includes apparatus for preventing fluid from flowing up the shaft to the motor.

Still another object is to provide a float, pump and motor assembly having a deflection bearing and an uniquely shaped deflector hub which cooperates with the bearing.

These, and other objects and advantages of the present invention, will become apparent as the same becomes better understood from the following detailed description when taken in conjunction with the accompany drawings.

DRAWINGS

FIG. 1 is a front elevational view of the apparatus of the present invention floating on a body of liquid;

FIG. 2 on sheet 2 of the drawings, is a longitudinal sectional view through the assembly of FIG. 1, and on a larger scale;

FIG. 3 is a fragmentary sectional view showing the shaft between the motor and the deflector hub and its adjacent parts in that area, and on a still larger scale than FIG. 2; and FIG. 4 is a greatly enlarged fragmentary sectional view illustrating the relationship between the shaft, deflection bearing, and deflector hub.

DESCRIPTION

Reference is now made more particularly to the drawings which illustrate the best presently known mode of carrying out the invention and wherein similar reference characters indicate the same parts throughout the several views.

Referring first to FIG. 1, there is shown the assembly generally designated by the numeral 10, floating in a liquid L. In the embodiment illustrated, the assembly includes a float 12, a propeller pump 14, and a motor 16. The propeller pump includes a propeller 31 mounted on a shaft 33 for rotation therewith. A casting 18 is mounted on the float 12 and supports the motor 16.

The float 12 includes a housing constructed of upper and lower plates 21 and 22, and a circumferential side plate 23. The housing is filled with polyurethane foam 24 to provide buoyancy even if there is a leak in the housing. The size of the float is chosen so that the total assembly floats with the surface of the liquid slightly below the midway point between the motor 16 and propeller 31.

Centrally located in the float 12 is an upright cylindrical shell 32 which extends from the top of the float to a point below the bottom of the float. Shell 32 contains the propeller 31 adjacent its lower end and provides a flow channel for the liquid L pumped by the propeller. Attached to the bottom of the shell 32 is a suction bell 34.

The casting 18 is preferably made of stainless steel and is mounted over the upper end of the shell 32. In the embodiment shown, the casting has an inner surface 41 which extends axially and then radially outward to provide a diffuser for the flow of the liquid. The casting conveniently provides a discharge outlet extending 360 degrees to provide the maximum outlet opening. A plurality of vanes 42 provide support for the main body of the casting on the float 12. As best shown in FIG. 2, the casting may include a ringlike element 43 at the bottom of the vanes 42 for bolting to the float 12. At the top of the casting 18 is a motor mount 44 for supporting the motor 16. A centrally located opening 46 is provided for passage of the shaft 33. The lower end 47 of the casting is preferably in a plane perpendicular to the axis of shaft 33 for a purpose which will hereafter become apparent.

In the embodiment illustrated, motor 16 is an electrical motor, for example from 5 to 60 horsepower. The motor has a rotor 52 mounted on shaft 33 and a surrounding stator 54. The rotor and stator may be of any convenient construction. Combined radial and thrust bearings 56 and 57 are located above and below the rotor 52. These bearings are heavy duty ball bearings which are double shielded and capped. As illustrated, the shaft 33 has shoulders adjacent the bearings 56 and 57. As is now apparent, the shaft 33 is a one-piece shaft and bearings 56 and 57 provide the support therefore. At the upper end of the shaft 33, there is conveniently provided a cap 58 of usual construction.

Referring now particularly to FIGS. 3 and 4, there is shown a deflection bearing 60 adjacent the lower end 47 of the casting 18. The deflection bearing 60 is preferably in the form of a cylindrical sleeve spaceed from the shaft 33. In the embodiment illustrated, the deflection bearing 60 has a press fit with the casting which extends inwardly slightly for a distance above the end 47 for this purpose. The deflection bearing is preferably formed of a resilient bearing material such as Teflon or neoprene. As shown, deflection bearing 60 extends downwardly past the lower end 47 of the casting a preselected distance. Its lower end 61 is in a plane perpendicular to the axis of shaft 33 for purpose to be explained.

A deflector hub, generally designated 70, is mounted on shaft 33 for rotation therewith. The hub is preferably formed of an elastomeric material such as neoprene or rubber. Referring to FIG. 4, the hub has a first land 71 which engages the end 61 of the deflection bearing 60. Land 71 extends outwardly past the outermost portion of the deflection bearing a distance approximating or at least equal to the space between the deflection bearing 60 and shaft 33. This is to accommodate the deflection bearing when the shaft is deflected. The hub has a second land 72 engaged with the end 47 of the casting 18. Similarly, land 72 extends outwardly past the outermost portion of the end 47 a distance approximating or at least equal to the space between the deflection bearing 60 and the shaft 33. The hub then extends upwardly and outwardly from the outer edge of land 72 at about a 45 degree angle as shown.

As an example of one embodiment of the invention, shaft 33 has a diameter of 2½ inches. Deflection bearing 60 has a thickness of 3/16 of an inch and is spaced from 1/16 inch to 1/8 inch from the shaft 33. End 47 of the casting 18 is approximately 3/8 of an inch in width. Lands 71 and 72 extend outwardly past deflection bearings 60 and end 47, respectively, approximately 1/8 inch.

With the particular arrangement above described, a seal is formed between the deflection bearing 60 and the hub 70 and between the hub 70 and the casting 18. In other words, a form of double seal is provided. Should the propeller 31 hit an obstruction, the propeller can deflect a distance and this deflection is limited somewhat when shaft 33 contacts deflection bearing 60. Since this is an impact type of bearing, the deflection bearing 60 is preferably formed of the aforementioned resilient bearing material. The cooperation between the hub 70 and the deflection bearing 60 and casting 18 is such that the aforementioned seals are maintained throughout any deflections.

Preferably, the lower end 61 of the deflection bearing 60 is located at a level above the top of the liquid L. To provide maximum support for deflection of the shaft 33, within limits of economy, this location is preferably about midway between the motor 16 and the propeller 31. Additionally, the design of the propeller and the flow channel is preferably such that the location of the aforementioned double seal is in a low pressure area. In this manner, any moisture that enters the passageway 46 is sucked out through the seals by virtue of this low pressure. Such moisture may enter the passageway 46 by reason of wind blowing the spray when the liquid L is aerated. To additionally assure that this moisture does not enter the motor 16, a slinger 78 is mounted on shaft 33 adjacent the lower end of the motor 16. The slinger 78 may be of any desired construction.

It is now deemed obvious that the above described apparatus cooperates to provide a low maintenance, continuous duty assembly which allows limited deflection of the propeller shaft yet prevents excessive deflection thereof. It is also deemed apparent that various parts of the apparatus cooperate to prevent water from flowing up the shaft and entering the motor.

While a preferred embodiment of the invention has herein been illustrated and described, this has been done by way of illustration and not limitation, and the invention should not be limited except as required by the scope of the appended claims.

The embodiments of the invention in which an exclusive property or privilege is claimed are defined as follows:

1. A float, pump, and motor assembly usable for liquid aeration and including a float for providing buoyancy so that the assembly floats at a preselected level in the liquid; a vertical propeller pump including a generally upright shaft and a propeller mounted on the shaft below the liquid level; and a motor supported on the float above the liquid level for rotating the propeller pump to pump the liquid upwardly for aeration; the improvement comprising: the shaft being a one-piece shaft extending into the motor and serving as the motor shaft; combined radial and thrust bearings at the motor for supporting the shaft for rotation; a generally tubular housing generally coaxial with the shaft; the housing having a lower end below the propeller and an upper end above the same to provide a flow passage for the liquid pumped by the propeller; the ends of the propeller being spaced a preselected distance from the housing; a deflection bearing circumjacent the shaft approximately midway between the propeller and motor and above the liquid level; the deflection bearing being spaced from the shaft under ordinary operating conditions a distance considerably less than the preselected distance between the ends of the propeller and the housing; and the deflection bearing being so constructed and arranged that the shaft, when deflected by the propeller hitting an obstruction, contacts the deflection bearing before the propeller can contact the housing.

2. A float, pump and motor assembly as set forth in claim 1 wherein the deflection bearing is a sleeve formed of resilient bearing material.

3. A float, pump and motor assembly as set forth in claim 1 wherein the motor is adapted to drive the propeller at a speed to develop a low-pressure zone axially above the propeller, and at least the lower end of the deflection bearing is located in said low-pressure zone; and including a deflector hub mounted on the shaft for rotation therewith and engaged with the lower end of the deflection bearing to provide a seal therewith, whereby the seal is above liquid level when the pump is not operating and is in a low-pressure zone when the pump is operating.

4. A float, pump, and motor assembly for use in aerating a liquid and including a buoyant float to float the assembly at a preselected level in the liquid; a propeller pump including a shaft and a propeller mounted on the shaft below the liquid level; the propeller arranged to pump the liquid upwardly for aerating the same; a motor housing supported on the float above the liquid level; and a motor in the motor housing and coaxial with the shaft for rotating the same; the improvement comprising: the shaft being a one-piece shaft extending into the motor and serving as the motor shaft; combined radial and thrust bearings supported on the motor housing for supporting the shaft; the motor being adapted to drive the propeller at a speed to develop a low-pressure zone axially above the propeller; a tubular deflection bearing surrounding the shaft between the propeller and motor; the deflection bearing having a lower end lying in a plane perpendicular to the shaft axis and disposed in the low-pressure zone; the deflection bearing being ordinarily spaced from the shaft and operative to engage the shaft when it is deflected to prevent excessive deflection thereof;

a deflector hub mounted on the shaft for rotation therewith; the deflector hub having a surface lying in a plane perpendicular to the axis of the shaft and engaged with the lower end of the deflection bearing; and said deflector hub surface extending from the shaft past the outermost portion of the low end of the deflection bearing a distance at least equal to the ordinary space between the deflection bearing and shaft.

5. An apparatus according to claim 4 wherein the deflection bearing is formed of a resilient bearing material and the deflector hub is formed of an elastomeric material.

6. An apparatus according to claim 5 including a generally tubular housing generally coaxial with the shaft; the housing having a lower end below the propeller and an upper end above the same to provide a flow passage for the liquid pumped by the propeller; the ends of the propeller being spaced a preselected distance from the housing; the deflection bearing being located approximately midway between the propeller and the motor; and the space between the deflection bearing and shaft being less than the space between the ends of the propeller and housing and so constructed and arranged that the shaft, when deflected, contacts the deflection bearing before the propeller can contact the housing.

7. An apparatus according to claim 5 including a casting supported on the float above the tubular housing and having: a central passageway therethrough for the passage of the shaft, a lower end located approximately midway between the propeller and the motor and arranged for supporting the deflection bearing at least partially in the central passageway, the lower end being in a plane perpendicular to the shaft axis, and a surface extending from the lower end and diverging radially and cooperating with the housing to provide a diffuser for the flow passage; means for mounting the motor housing on the casting; and a slinger mounted on the shaft for rotation therewith at the top of the central passageway of the casting; and wherein the deflector hub has a land engaged with the lower end of the casting, and the land being perpendicular to the shaft axis and extending outwardly past the outermost portion of the lower end of the casting a distance at least equal to the ordinary space between the deflection bearing and shaft.

8. A float, pump, and motor assembly for use in aerating a liquid and including a float to float the assembly at a preselected level in the liquid; a propeller pump for pumping the liquid for aeration and including a generally upright shaft and a propeller mounted on the shaft below the liquid level; and a motor supported on the float above the liquid level for driving the propeller pump; the improvement comprising: a tubular deflection bearing formed of resilient bearing material and circumjacent the shaft above the propeller; the deflection bearing having a lower end lying in a plane perpendicular to the shaft axis; the deflection bearing being ordinarily spaced from the shaft and operative to engage the shaft when it is deflected to prevent excessive deflection thereof; a member having a surface defining at least a portion of the flow passage along the shaft above the propeller; the member having an opening therethrough for passage of the shaft and a lower end spaced above the lower end of the deflection bearing; the member supporting the deflection bearing in its circumjacent, spaced position; a deflector hub mounted on the shaft for rotation therewith; the deflector hub having a land lying in a plane perpendicular to the axis of the shaft and engaged with the lower end of the deflection bearing to provide a seal therewith; and said land extending from the shaft past the outermost portion of the lower end of the deflection bearing a distance approximating the ordinary space between the deflection bearing and shaft, whereby the contact between the lower end of the deflection bearing and the land continues when the shaft is deflected.

9. The combination of claim 8 wherein the lower end of the member lies in a plane perpendicular to the shaft axis and has a thickness greater than the space between the deflection bearing and shaft; and wherein the deflector hub has a second land, parallel to the first land, and engaged with the lower end of the member.

10. The combination of claim 9 wherein the second land extends outwardly past the outermost portion of the lower end of the member a distance approximating the ordinary space between the deflection bearing and shaft; and wherein the deflector hub has a portion extending upwardly from the outer edge of the second land.

11. The combination of claim 10 wherein the motor is mounted on the member and coaxial with the shaft, the shaft is a one-piece shaft from the propeller and extending into the motor to also serve as a motor shaft, and the deflection bearing being located approximately midway between the motor and propeller; and including upper and lower combined radial and thrust bearings at the motor for supporting the shaft for rotation.

References Cited
UNITED STATES PATENTS

| | | | |
|---|---|---|---|
| 3,152,791 | 10/1964 | Svensson | 259—1 |
| 3,218,042 | 11/1965 | Ciabattari et al. | 259—95 |
| 3,443,794 | 5/1969 | Peterson | 259—107X |
| 3,515,375 | 6/1970 | Roos | 259—8X |

JORDAN FRANKLIN, Primary Examiner

G. V. LARKIN, Assistant Examiner

U.S. Cl. X.R.

259—115; 308—1, 35

PO-1050
(5/69)

UNITED STATES PATENT OFFICE
CERTIFICATE OF CORRECTION

Patent No. 3,606,273              Dated September 20, 1971

Inventor(s) John K. Johnson

It is certified that error appears in the above-identified patent and that said Letters Patent are hereby corrected as shown below:

Column 5, line 6, "low" should be -- lower --.

Column 5, line 26, the numeral "5" should be -- 6 --.

Signed and sealed this 7th day of March 1972.

(SEAL)
Attest:

EDWARD M. FLETCHER, JR.
Attesting Officer

ROBERT GOTTSCHALK
Commissioner of Patents